United States Patent
Shimamura et al.

(10) Patent No.: US 11,372,604 B2
(45) Date of Patent: Jun. 28, 2022

(54) IMAGE FORMING APPARATUS, METHOD OF CONTROLLING THE SAME, AND NON-TRANSITORY STORAGE MEDIUM STORING PROGRAM EXECUTABLE BY THE IMAGE FORMING APPARATUS

(71) Applicant: BROTHER KOGYO KABUSHIKI KAISHA, Nagoya (JP)

(72) Inventors: Yasuhiro Shimamura, Nagoya (JP); Hajime Usami, Nagoya (JP); Seigo Hayashi, Nagoya (JP)

(73) Assignee: BROTHER KOGYO KABUSHIKI KAISHA

( * ) Notice: Subject to any disclaimer, the term of this patent is extended or adjusted under 35 U.S.C. 154(b) by 0 days.

(21) Appl. No.: 17/209,804

(22) Filed: Mar. 23, 2021

(65) Prior Publication Data
US 2021/0373819 A1    Dec. 2, 2021

(30) Foreign Application Priority Data
Mar. 30, 2020   (JP) .............................. JP2020-061291

(51) Int. Cl.
   *G06F 3/12*     (2006.01)
(52) U.S. Cl.
   CPC .......... *G06F 3/1221* (2013.01); *G06F 3/1229* (2013.01); *G06F 3/1236* (2013.01); *G06F 3/1293* (2013.01)
(58) Field of Classification Search
   CPC .... G06F 3/1221; G06F 3/1229; G06F 3/1236; G06F 3/1293
   USPC ........................................... 358/1.15
   See application file for complete search history.

(56) References Cited

U.S. PATENT DOCUMENTS

| | | | |
|---|---|---|---|
| 2013/0120780 A1* | 5/2013 | Hamada | G03G 15/5083 358/1.13 |
| 2015/0264208 A1* | 9/2015 | Achiwa | H04N 1/00885 358/1.15 |
| 2018/0284865 A1* | 10/2018 | Shimamura | H04N 1/00904 |
| 2020/0089445 A1* | 3/2020 | Morimoto | G06F 3/1284 |

FOREIGN PATENT DOCUMENTS

JP   2015-176442 A   10/2015

* cited by examiner

*Primary Examiner* — Allen H Nguyen
(74) *Attorney, Agent, or Firm* — Merchant & Gould P.C.

(57) ABSTRACT

An image forming apparatus, including: an image forming engine; an interface; and a controller; wherein the controller is configured to: supply electric power to an external device via the interface; determine whether to execute, during executing the supplying the electric power to the external device via the interface, a first operation relating to image formation by the image forming engine; limit a power amount to be supplied to the external device when the controller determines to execute the first operation based on a result of the determining whether to execute the first operation; execute the first operation in a state in which the power amount to be supplied to the external device is limited; and determine, after the controller has started the executing the first operation, whether to execute a second operation different from the first operation.

19 Claims, 8 Drawing Sheets

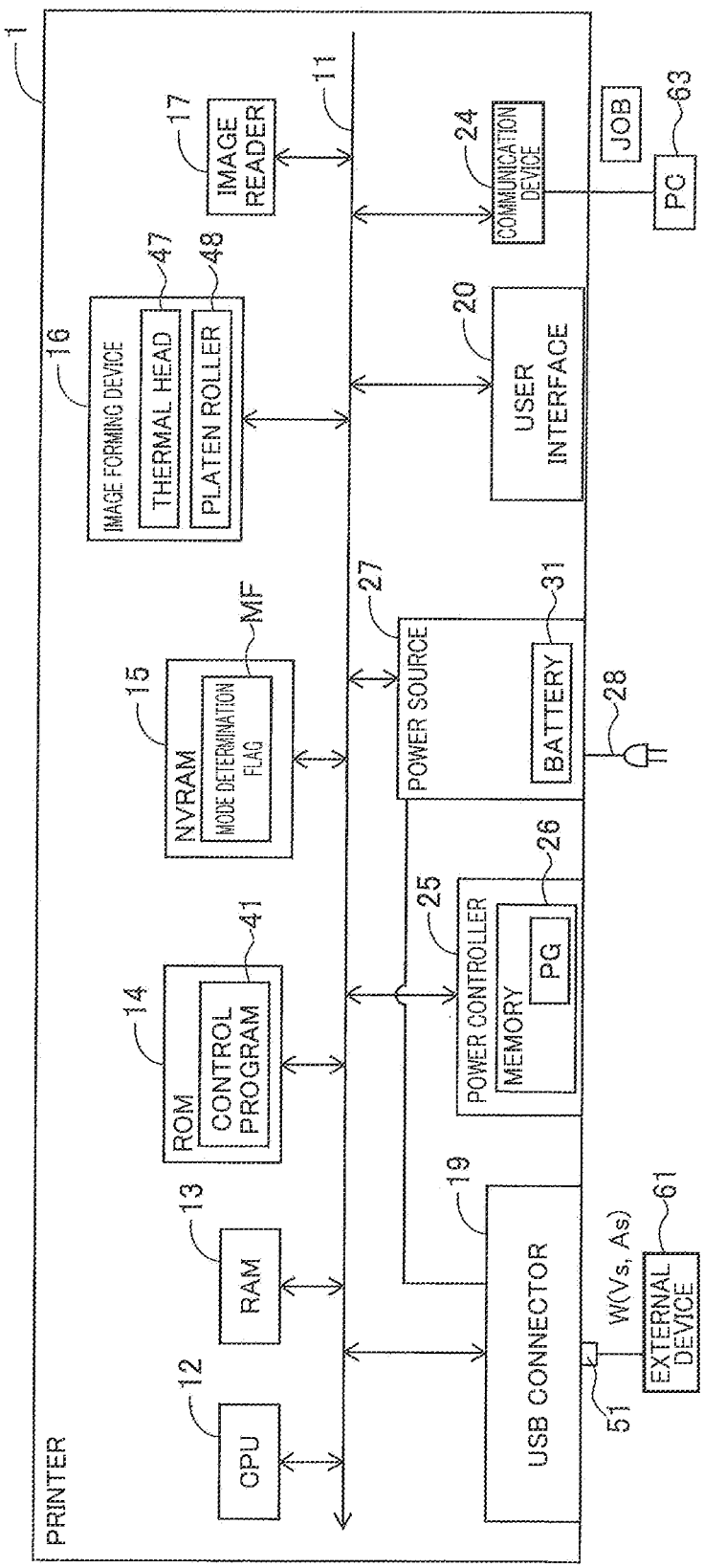

FIG. 2

TYPE OF MESSAGES AND CONTENTS OF MESSAGES

| NO | TYPE OF MESSAGES | DIRECTION | CONTENTS |
|---|---|---|---|
| 1 | SUPPLY CAPABILITY (Capability) | PRINTER → EXTERNAL DEVICE | INFORMATION INDICATING COMBINATIONS OF SUPPLY VOLTAGE Vs AND SUPPLY CURRENT As SUPPLIABLE FROM PRINTER (POWER LIST) |
| 2 | SUPPLY REQUEST (Request) | EXTERNAL DEVICE → PRINTER | (1) INFORMATION INDICATING COMBINATION OF SUPPLY VOLTAGE Vs AND SUPPLY CURRENT As REQUESTED BY EXTERNAL DEVICE<br>(2) Mismatch FLAG<br>FLAG INDICATING PRESENCE OR ABSENCE OF MISMATCH WITH RESPECT TO SUPPLY CAPABILITY MESSAGE<br>(FLAG IS ON IN THE CASE OF MISMATCH AND OFF IN THE CASE OF MATCH)<br>(3) GiveBack ATTRIBUTE FLAG<br>FLAG INDICATING WHETHER POWER AMOUNT CHANGE IS ACCEPTABLE AFTER STARTING POWER SUPPLYING<br>(FLAG IS ON WHEN POWER AMOUNT CHANGE IS ACCEPTABLE AND OFF WHEN POWER AMOUNT CHANGE IS NOT ACCEPTABLE)<br>(4) MINIMUM OPERATING CURRENT VALUE<br>MINIMUM CURRENT VALUE REQUESTED WHEN POWER AMOUNT IS MINIMIZED (NOTIFIED ONLY WHEN GiveBack ATTRIBUTE FLAG IS ON) |
| 3 | SUPPLY ACCEPT (Accept) | PRINTER → EXTERNAL DEVICE | MESSAGE INDICATING THAT POWER SUPPLYING ACCORDING TO SUPPLY REQUEST MESSAGE IS EXECUTABLE |
| 4 | SUPPLY PREPARATION COMPLETION (PS_RDY) | PRINTER → EXTERNAL DEVICE | MESSAGE INDICATING THAT PREPARATION FOR STARTING POWER SUPPLYING ACCORDING TO SUPPLY REQUEST MESSAGE IS COMPLETED |
| 5 | SUPPLY REJECT (Reject) | PRINTER → EXTERNAL DEVICE | MESSAGE INDICATING THAT POWER SUPPLYING ACCORDING TO SUPPLY REQUEST MESSAGE IS NOT EXECUTABLE |
| 6 | SUPPLY MINIMIZATION REQUEST (GoToMin) | PRINTER → EXTERNAL DEVICE | MESSAGE NOTIFYING CHANGE REQUEST FOR MINIMIZING POWER AMOUNT |
| 7 | SUPPLY STOP REQUEST (HardReset) | EXTERNAL DEVICE → PRINTER | MESSAGE NOTIFYING STOP OF POWER SUPPLYING |

IMAGE FORMING APPARATUS, METHOD OF CONTROLLING THE SAME, AND NON-TRANSITORY STORAGE MEDIUM STORING PROGRAM EXECUTABLE BY THE IMAGE FORMING APPARATUS

CROSS REFERENCE TO RELATED APPLICATION

The present application claims priority to Japanese Patent Application No. 2020-061291, which was filed on Mar. 30, 2020, the disclosure of which is herein incorporated by reference in its entirety.

BACKGROUND

Technical Field

The following disclosure relates to an image forming apparatus configured to supply electric power to an external device, a method of controlling the image forming apparatus, and a non-transitory storage medium storing a program executable by the image forming apparatus.

Description of Related Art

Various image forming apparatuses configured to supply electric power to an external device via an interface have been conventionally proposed. For example, a known printing apparatus supplies, to an external device, electric power form a USB interface according to USB PD (USB Power Delivery) standard. When the printing apparatus receives a print instruction during supplying electric power to the external device, the printing apparatus performs printing based on the received print instruction after having reduced electric power to be supplied to the external device. When the printing based on the received print instruction is completed, the printing apparatus executes a negotiation relating to power transmission/reception with the external device. The printing apparatus determines, based on the result of the negotiation, an amount of electric power to be supplied and restarts supplying electric power to the external device in the determined power amount. In the following description, "an amount of electric power to be supplied" will be referred to as "a power amount to be supplied", and "to supply electric power in an amount" will be referred to as "to supply a power amount".

SUMMARY

The known printing apparatus described above starts the negotiation and restarts supplying the electric power immediately after completion of the printing. After having restarted supplying the electric power, the printing apparatus determines whether a new print instruction has been received. In a case where the new print instruction has been received, the printing apparatus again limits the power amount to be supplied. Here, in the conventional configuration, a case is considered in which the printing apparatus receives the new print instruction in the midst of executing the printing while limiting the power amount, for instance. In this case, even if the printing apparatus completes execution of a print instruction received prior to the new print instruction and cancels the limiting of the power amount, the printing apparatus needs to again limit the power amount soon after cancellation. This may cause frequent switchovers between the limiting of the power amount and the cancellation of the limiting of the power amount.

Accordingly, an aspect of the present disclosure is directed to: an image forming apparatus configured to limit a power amount to be supplied to an external device when executing an operation relating to image formation, the image forming apparatus being capable of canceling limiting of the power amount at an appropriate timing and restarting supplying the electric power; a method of controlling the image forming apparatus; and a non-transitory storage medium storing a program executable by the image forming apparatus.

In one aspect of the present disclosure, an image forming apparatus includes: an image forming engine; an interface; and a controller; wherein the controller is configured to: supply electric power to an external device via the interface; determine whether to execute, during executing the supplying the electric power to the external device via the interface, a first operation relating to image formation by the image forming engine; limit a power amount to be supplied to the external device when the controller determines to execute the first operation based on a result of the determining whether to execute the first operation; execute the first operation in a state in which the power amount to be supplied to the external device is limited; and determine, after the controller has started the executing the first operation, whether to execute a second operation different from the first operation.

In another aspect of the present disclosure, an image forming apparatus includes: an image forming engine; an interface; and a controller, wherein the controller is configured to: supply electric power to an external device via the interface; determine whether to execute, during executing the supplying the electric power to the external device via the interface, an operation relating to image formation by the image forming engine; limit a power amount to be supplied to the external device when the controller determines to execute the operation relating to the image formation based on a result of the determining whether to execute the operation relating to the image formation; execute the operation relating to the image formation in a state in which the power amount to be supplied to the external device is limited; determine, after completion of the executing the operation relating to the image formation, whether to shift to a power saving mode for reducing power consumption; supply the electric power to the external device after having canceled the limiting of the power amount to be supplied to the external device by the limiting the power amount when the controller determines to shift to the power saving mode based on a result of the determining whether to shift to the power saving mode after having canceled the limiting of the power amount; and shift to the power saving mode when the controller determines to shift to the power saving mode based on a result of the determining whether to shift to the power saving mode after having canceled the limiting of the power amount.

In still another aspect of the present disclosure, a method of controlling an image forming apparatus comprising an image forming engine, an interface, and a controller, the method includes: a power supplying step of supplying electric power to an external device via the interface; a first determination step of determining whether to execute, during executing the power supplying step, a first operation relating to image formation by the image forming engine; a power-amount limiting step of limiting a power amount to be supplied to the external device when the controller determines to execute the first operation based on a result of the first determination step; a first execution step of executing the first operation in a state in which the power amount to be supplied to the external device is limited; and a second determination step of determining, after the controller has started the first execution step, whether to execute a second operation different from the first operation.

In further aspect of the present disclosure, a method of controlling an image forming apparatus comprising an image forming engine, an interface, and a controller, the method comprising: a first power supplying step of supplying electric power to an external device via the interface; a determination step of determining whether to execute, during executing the first power supplying step, an operation relating to image formation by the image forming engine; a power-amount limiting step of limiting a power amount to be supplied to the external device when the controller determines to execute the operation relating to the image formation based on a result of the determination step; an execution step of executing the operation relating to the image formation in a state in which the power amount to be supplied to the external device is limited; a mode-shifting determination step of determining, after completion of the execution step, whether to shift to a power saving mode for reducing power consumption; a second power supplying step of supplying the electric power to the external device after having canceled the limiting of the power amount to be supplied to the external device by the power-amount liming step when the controller determines to shift to the power saving mode based on a result of the mode-shifting determination step; and a mode shifting step of shifting to the power saving mode when the controller determines to shift to the power saving mode based on a result of the mode-shifting determination step.

In still further aspect of the present disclosure, a non-transitory storage medium storing a program executable by a computer of an image forming apparatus including an image forming engine and an interface, wherein, when executed by the computer, the program causes the image forming apparatus to: supply electric power to an external device via the interface; determine whether to execute, during executing the supplying the electric power to the external device via the interface, a first operation relating to image formation by the image forming engine; limit a power amount to be supplied to the external device when it is determined to execute the first operation based on a result of the determining whether to execute the first operation; execute the first operation in a state in which the power amount to be supplied to the external device is limited; and determine, after the executing the first operation has been started, whether to execute a second operation different from the first operation.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which:

FIG. 1 is a block diagram illustrating an electrical configuration of a printer according to a first embodiment;

FIG. 2 is a table illustrating a type of messages and contents of the messages defined according to USB PD standard;

DETAILED DESCRIPTION OF THE EMBODIMENTS

Figure 3:
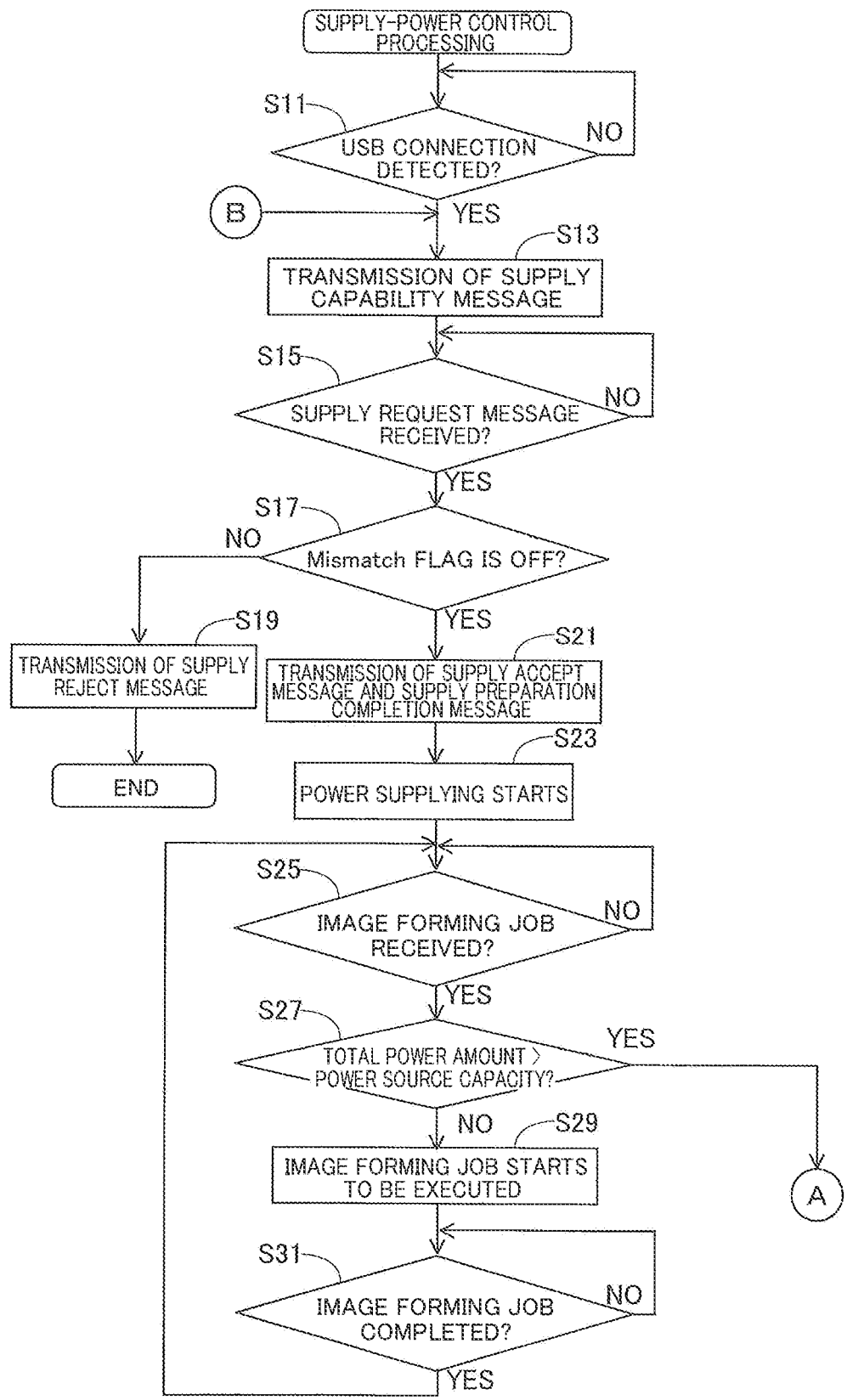
FIG. 3 is a part of a flowchart indicating a supply-power control processing executed in the first embodiment.

Referring to FIG. 1, there will be hereinafter described a portable printer 1 as one example of an image forming apparatus according to one embodiment.

1. Configuration of Portable Printer

FIG. 1 illustrates an electric configuration of a portable printer 1 according to one embodiment. For example, the printer 1 is a portable printing apparatus that prints, on a suitable sheet (such as thermal paper), an image corresponding to image data of a print job received from a PC, a smartphone or the like over wired communication or wireless communication. The printer 1 includes a CPU12, a RAM 13, a ROM 14, an NVRAM 15, an image forming device (that may be also referred to as an image forming engine) 16, an image reader 17, a USB (Universal Serial Bus) connector 19, a user interface 20, a communication device 24, a power controller 25, and a power source 27. These devices such as the CPU 12 are connected to each other by a bus 11.

The ROM 14 is a nonvolatile memory such as a flash memory and stores various programs such as a control program 41. For example, the CPU 12 executes the control program 41 read out from the ROM 14 and activates the system of the printer 1. The data storage location indicated above is just one example. The control program 41 may be stored in the NVRAM 15, for example. The storage that stores the control program 41 may be a computer-readable storage medium. There may be employed, as the computer-readable storage medium, a recording medium such as a CD-ROM or a DVD-ROM, in addition to the above example.

The control program 41 is a firmware that performs overall control of the devices of the printer 1, for example. The CPU 12 executes the control program 41 to control the devices connected by the bus 11 while temporarily storing executed processing results in the RAM 13. In the following description, the CPU 12 that executes the control program 41 will be simply referred to as "the CPU 12" where appropriate. For example, the wording "the CPU 12" means, in some cases, "the CPU 12 that executes the control program 41".

The NVRAM 15 is a nonvolatile memory. The NVRAM 15 stores various sorts of setting information of the printer 1. The NVRAM 15 of the present embodiment stores a mode determination flag MF used for determining whether the printer 1 shifts to a power saving mode. The power saving mode and processing as to the mode determination flag MF will be later explained in detail.

The image forming device 16 includes, for example, a line-type thermal head 47 and prints an image on a sheet according to a direct thermal method based on control by the CPU 12. The image forming device 16 conveys the sheet by rotating a platen roller 48 opposed to the thermal head 47. For example, when the sheet is inserted into an insertion opening of the printer 1 at the start of printing, the inserted sheet is guided to a position between the platen roller 48 and the thermal head 47 and is discharged through a discharge opening after completion of printing.

The structure of the image forming device 16 described above is one example. The image forming device 16 may include a toner cartridge, a photoconductive drum, a developer roller, and an exposure device and may be configured to perform printing according to an electrophotographic method. Alternatively, the image forming device 16 may include an inkjet head and an ink cartridge and may be configured to perform printing according to an inkjet printing method.

The image reader 17 includes a document support (not illustrated) and an image sensor such as a contact image sensor (CIS) or a charge-coupled device (CCD). The image reader 17 moves the CIS with respect to a document placed on the document support, reads the document to form image data, and stores the image data in the RAM 13.

The USB connector 19 is an interface that performs communication and transmission/reception of electric power according to the USB PD (USB Power Delivery) standard. The USB connector 19 includes a receptacle 51 as a connector. The USB connector 19 performs data communication and power transmission/reception with various external devices 61 connected to the receptacle 51. FIG. 1 illustrates one example in which one external device 61 is connected to one receptacle 51. Examples of the external device include various devices connectable according to the USB standard such as a smartphone, a personal computer, a notebook computer, a printer, an external hard disk, a USB memory, and a card reader. The USB connector 19 may include a plurality of receptacles 51.

The receptacle 51 is a connector compliant with the USB Type-C standard, for example. The receptacle 51 includes a plurality of signal lines for data communication and power transmission/reception. For example, the receptacle 51 includes, as the plurality of signal lines, a TX signal line, an RX signal line, a D signal line, a Vbus signal line, a CC signal line, and a ground signal line in USB Type-C standard connector. It is noted that the signal line may be referred to as a pin. The receptacle 51 performs data communication using any of the TX signal line, the RX signal line, and the D signal line. The D signal line is, for example, a Data signal line and refers to D+/D−. The receptacle 51 supplies and receives electric power using the Vbus signal line.

The CC signal line is a signal line used for determining a power role, for example. The CC signal line includes a CC1 signal line and a CC2 signal line for two sides (front and back) of a plug connected to the receptacle 51. The CC signal line is also used as a signal line for communication relating to apparatus management such as an alert message. The printer 1 according to the present embodiment uses the CC signal line for transmission/reception of messages illustrated in FIG. 2 as later explained. The communication channel used for the message transmission/reception is not limited to the CC signal line but may be other signal lines such as the D signal line or may be a combination of a plurality of signal lines. The receptacle 51 has a dual role power (DRP) function of switching between a power source that is a power role of supplying electric power and a power sink that is a power role of receiving electric power.

The power controller 25 controls power transmission/reception and data transmission/reception via the USB connector 19. The power controller 25 determines the power role based on the connection state of the CC signal line (such as the potential of the CC signal line) when the external device 61 is connected to the receptacle 51, and executes a negotiation for power transmission/reception. Here, the negotiation is a processing for setting the power source or the power sink, for setting an amount of electric power to be transmitted and received, etc.

The power controller 25 executes a negotiation for setting an amount W of electric power to be supplied via the Vbus signal line with respect to the receptacle 51 functioning as the power source. In the following explanation, "an amount W of electric power to be supplied" will be referred to as "a power amount W to be supplied" The power controller 25 sends a power list of the power amount W to the external device 61, based on control by the CPU 12. Here, the power list is information indicating combinations of a voltage value of a supply voltage Vs and a current value of a supply current As that are suppliable by the printer 1 as the power source. The power list may be referred to as a profile. The combinations of the voltage value and the current value may be referred to as PDO (Power Data Object). For example, in the power transmission/reception via the USB connector 19 according to the present embodiment, the electric power can be supplied from the power source to the power sink in a power amount range of 10 W (5V, 2 A) to 100 W (20V, 5 A). The power list is information indicating the combinations (PDO) of the voltage value and the current value suppliable by the printer 1 functioning as the power source within the above power amount range.

When causing the receptacle 51 to function as the power sink, the power controller 25 executes a negotiation as to the reception of the electric power via the receptacle 51. For example, the power controller 25 requests a combination of the voltage value and the current value desired to receive in the power list received from the external device 61 functioning as the power source, based on control by the CPU 12. When the negotiation succeeds, the receptacle 51 receives the desired electric power from the external device 61.

As illustrated in FIG. 1, the power controller 25 includes a memory 26. The memory 26 stores a program PG, for example. The power controller 25 includes a processing circuit such as a CPU. The power controller 25 executes the program PG in the processing circuit to thereby execute control of the power source 27, for example. The memory 26 is constituted by a combination of a RAM, a ROM, a flash memory, and the like.

The power source 27 functions as a power source for the devices in the printer 1 and supplies electric power to the devices. The power source 27 includes a power cord 28 and a battery 31. The power source 27 generates a direct voltage of a desired voltage value from an alternating voltage received from an AC power source via the power cord 28 and supplies the generated direct voltage to the devices in the printer 1. The power source 27 converts a direct voltage supplied from the battery 31 and generates a direct voltage to be supplied to the devices in the printer 1. Thus, even when the printer 1 is not connected to the AC power source, the printer 1 can be driven by the battery 31. The battery 31 is configured to be charged with electric power supplied via the power cord 28 or electric power received from the external device 61 via the USB connector 19.

The power source 27 is connected to the USB connector 19. The power source 27 generates, from the alternating voltage received via the power cord 28 or the direct voltage supplied from the battery 31, electric power in an amount W (supply voltage Vs, supply current As) to be supplied from the USB connector 19 to the external device 61. In the following explanation, "electric power in an amount W to be supplied" will be referred to as "a power amount W to be supplied".

The user interface 20 is a touch panel, for example, and includes a liquid crystal panel, a light source such as an LED that emits light from the back side of the liquid crystal panel, and a contact sensing film bonded to the surface of the liquid crystal panel. The user interface 20 receives an operation on the printer 1 and outputs, to the CPU 12, a signal corresponding to the operation input. The user interface 20 displays information relating to the printer 1. The user interface 20 changes the display contents of the liquid crystal panel based on control by the CPU 12. The user interface 20 may include operation buttons such as hardware keys. The user interface 20 need not necessarily have the structure, such as the touch panel, in which the display and the operation portion are integral, but may include the display and the operation portion separately.

The communication device 24 is a communication device capable of performing wired communication and wireless communication. As illustrated in FIG. 1, the communication device 24 is wiredly connected to a PC 63 via a LAN cable. The CPU 12 controls the communication device 24 and receives an image forming job JOB from the PC 63. The image forming job JOB includes a print job instructing the image forming device 16 to perform printing based on image data and a scan job instructing the image reader 17 to perform scanning. The printer 1 receives the image forming job JOB from the PC 63 over the wired communication and executes image formation based on the received image forming job JOB. The communication for receiving the image forming job JOB may be wireless communication such as Bluetooth (registered trademark). The device that transmits the image forming job JOB is not limited to the PC 63, but may be a smartphone or a tablet computer. The printer 1 is capable of receiving the image forming job JOB by data communication via the USB connector 19. The CPU 12 receives the image forming job JOB based on the operation input to the user interface 20 and performs copying and scanning.

2. Mode

The present printer 1 has a function of shifting to the power saving mode for reducing power consumption. Here, the power saving mode is a standby mode in which the printer 1 is placed in a standby state to reduce power consumption, for example. For the mode determination flag MF stored in the NVRAM 15, two values are set, for example, i.e., a value for allowing the printer 1 to shift to the power saving mode (hereinafter referred to as "the setting of the mode determination flag MF is ON" where appropriate) and a value for not allowing the printer 1 to shift to the power saving mode (hereinafter referred to as "the setting of the mode determination flag MF is OFF" where appropriate). The printer 1 sets the mode determination flag MF to ON when the printer 1 detects that a request for executing a next image forming job JOB (such as a print job or a scan job), a user's input operation through the touch panel of the user interface 20 or the like, is not made for a predetermined length of time after completion of the printing operation or the scanning operation, for example. The printer 1 shifts to the standby mode when all the operations currently being executed are completed. When the printer 1 shifts to the standby mode, the printer 1, for example, stops energization of the thermal head of the image forming device 16 and the image sensor of the image reader 17 and turns off a backlight of the display panel of the user interface 20 to place the display panel in a non-displaying state, so as to reduce power consumption. When the printer 1 receives the print job or the like, for example, the printer 1 sets the mode determination flag MF to OFF, cancels the power saving mode, and executes the print job.

The power saving mode in the present disclosure is not limited to the standby mode described above. For example, the printer 1 may include a low power consumption mode (e.g., a sleep mode) in which power consumption is reduced more than in the standby mode. For example, when a request for executing the image forming job JOB or a user's input operation, etc., is not made for a predetermined length of time after shifting to the standby mode, the printer 1 shifts to the low power consumption mode for achieving further power saving. In the low power consumption mode, the printer 1 may activate only a part of the power source 27 to stop supplying electric power to the image forming device 16 and the image reader 17, so as to achieve power saving.

3. Messages in USB PD Communication

FIG. 2 is a table indicating a type of messages defined according to the USB PD standard and contents of the messages. Among the messages used in the USB PD communication, messages used in control of transmission/reception of electric power are indicated in FIG. 2. In the table of FIG. 2, there are indicated, in order from the left, NO (number), the type of messages, a communication direction of message transmission/reception, and the contents of the messages. The communication direction indicated in FIG. 2 is a direction in a case where the printer 1 functions as the power source for supplying the electric power.

A supply capability (Capability) message of NO. 1 is a message transmitted from the printer 1 to the external device 61 and contains information indicating the combinations of the supply voltage Vs and the supply current As of the power amount W suppliable from the printer 1, namely, indicating the power list.

A supply request (Request) message of NO. 2 is a message transmitted from the external device 61 to the printer 1. The supply request message contains information, i.e., (1) in the contents, indicating a combination of the supply voltage Vs and the supply current As requested by the external device 61 among the combinations indicated by the power capability message. The supply request message contains a Mismatch flag, i.e., (2) in the contents, indicating capability mismatch. The Mismatch flag is a flag indicating the presence or absence of capability mismatch with respect to the supply capability message. For example, the Mismatch flag is a flag indicating whether i) there is a combination of the supply voltage Vs and the supply current As requested or requestable by the external device 61 among the combinations indicated by the supply capability message and the external device 61 accordingly requests electric power or ii) there is no combinations desired by the external device 61 and the external device 61 does not request electric power. For the Mismatch flag, there are set, for example, a bit value indicating ON in the case of capability mismatch (not requesting) and a bit value indicating OFF in the case of capability match (requesting).

The supply request message contains a GiveBack attribute flag indicating whether changing the power amount W to be supplied is acceptable or not, i.e., (3) in the contents. For example, the GiveBack attribute flag is a flag indicating whether the external device 61 as the power sink accepts changing the power amount W after power supplying has been started. For the GiveBack attribute flag, there are set, for example, a bit value indicating ON when the external device 61 accepts changing the power amount W and a bit value indicating OFF when the external device 61 does not accept changing the power amount W.

In some cases, the supply request message contains a minimum operating current value, i.e., (4) in the contents. The minimum operating current value is a minimum current value requested when the power amount W is changed so as to be minimized. In a case where the power amount W is minimized, the external device 61 sets the minimum operating current value corresponding to the power amount required at a minimum, for example. In a case where the printer 1 receives the GiveBack attribute flag set at ON and changes the power amount W after having started power supplying, the printer 1, for example, lowers the electric current to be supplied down to the supply current As satisfying or corresponding to the minimum operating current value and reduces the power amount W, so as to limit the power amount W. Based on the minimum operating current value and the combinations of the supply voltage Vs and the supply current As that are suppliable and that are indicated by the power list, the printer 1 determines the power amount W (supply voltage Vs, supply current As) to be supplied during limiting the power amount W. Thus, the minimum operating current value is notified to the printer 1 from the external device 61 only when the GiveBack attribute flag is set at ON. It is noted that the limiting of the power amount in the present disclosure is a concept including not only merely reducing the power amount but also reducing the power amount to zero.

The information on the power amount requested by the external device 61 during limiting the power amount W is not limited to the minimum operating current value. For example, the information on the power amount requested by the external device 61 may be a voltage value or may be information defined by a combination of a current value and a voltage value.

A supply accept (Accept) message of NO. 3 is a message transmitted from the printer 1 to the external device 61. The supply accept message indicates that the power supplying according to the supply request message is executable. A supply preparation completion (PS_RDY) message of NO. 4 is a message transmitted form the printer 1 to the external device 61. The supply preparation completion message indicates that preparation for the power supplying according to the supply request message is completed.

A supply reject (Reject) message of NO. 5 is a message transmitted from the printer 1 to the external device 61. The supply reject message indicates that the power supplying according to the supply request message is not executable. A supply minimization request (GoToMin) message of NO. 6 is a message transmitted from the printer 1 to the external device 61. The supply minimization request message is a message notifying a request to change the power amount W for minimization according to the GiveBack attribute flag and the minimum operating current value of the supply request message. A supply stop request (HardReset) message of NO. 7 is a message transmitted from the external device 61 to the printer 1. The supply stop request message is a message notifying stop of the power supplying.

4. Supply-Power Control Processing

Figure 4:
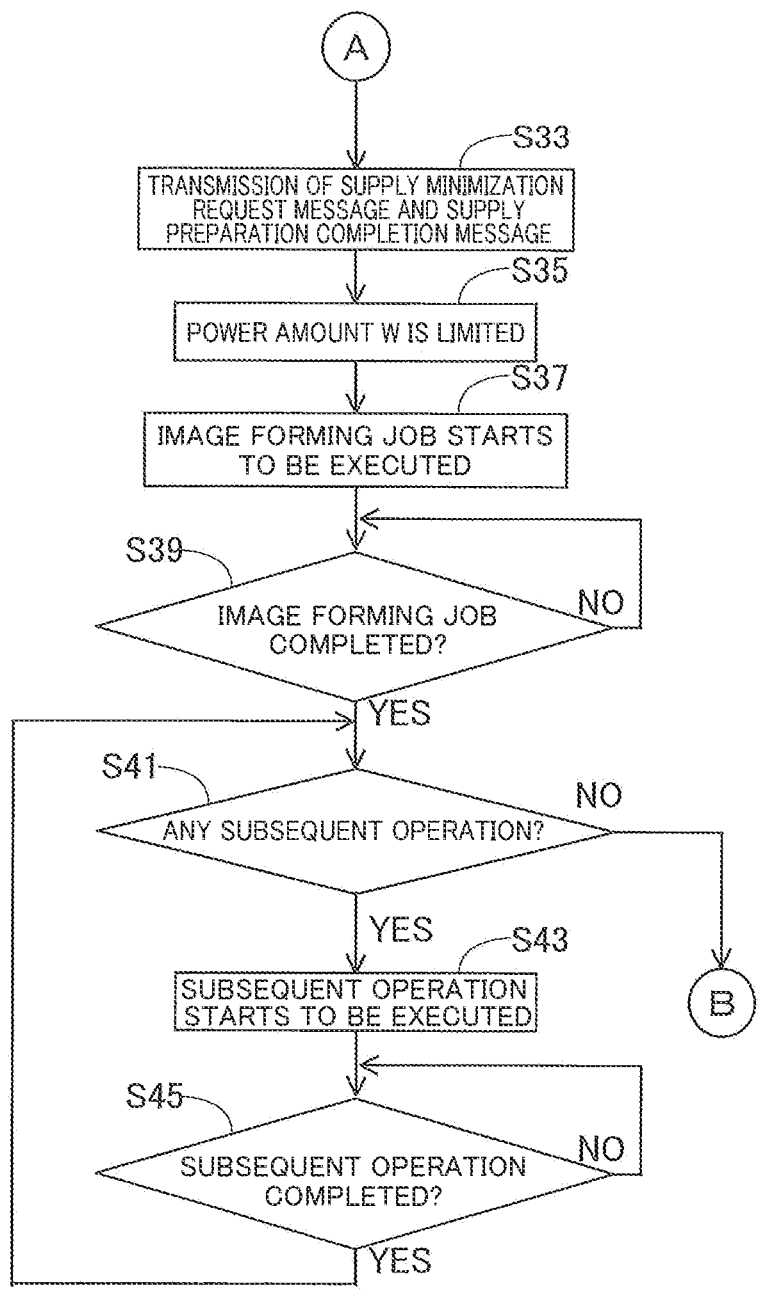
FIG. 4 is a part of the flowchart indicating the supply-power control processing executed in the first embodiment.

Referring next to FIGS. 3 and 4, there will be explained a supply-power control processing executed by the printer 1 according to the first embodiment. When the printer 1 is powered on, the CPU 12 of the printer 1 executes the control program 41 to start up the system of the printer 1 and then executes a supply-power control processing illustrated in FIGS. 3 and 4. By executing the supply-power control processing, the CPU 12 limits the power amount W based on reception of the image forming job JOB and cancels the limiting of the power amount W based on completion of the image forming job JOB.

In the following explanation, there will be explained a case where the printer 1 is the power source and supplies electric power to the external device 61. There will be explained a case where the printer 1 receives the image forming job JOB as one example of the first operation and the second operation. The first and second operations are not limited to the image forming job JOB. There may be employed, as the first and second operations, various operations that relate to image formation and that consume electric power, for example. The first and second operations may be a cooling-down operation for releasing heat accumulated in the printer 1, for example. The cooling-down operation is an operation in which the heat is released by rotating a fan when the temperature in the housing of the printer 1 becomes higher than or equal to a threshold value. In a case where the image forming device 16 performs printing according to the electrophotographic method, the cooling-down operation may be an operation in which the temperature of a fixing device is lowered by rotating the fixing device in a non-printing state.

The first and second operations may be an image-quality calibration operation for adjusting an image quality. In a case where the image forming device 16 performs printing according to the electrophotographic method and a toner image is formed with toner on a conveyor belt that conveys a sheet, for example, the image-quality calibration operation is an operation in which the concentration and the position of the formed toner image are detected so as to calibrate the concentration of each color and the position deviation. In a case where the image forming device 16 performs printing according to the ink-jet method, the image-quality calibration operation may be an operation for cleaning nozzles or an operation for checking nozzle clogging.

The first and second operations are not limited to the cooling-down operation and the image-quality calibration operation. For example, the first and second operations may be an operation for discarding, to a waste toner box, toner built up in the toner cartridge. Thus, various operations relating to image formation by the image forming device are employable as the first and second operations.

The condition for starting the supply-power control processing illustrated in FIGS. 3 and 4 is not limited to the startup of the system. For example, the CPU 12 may execute the supply-power control processing when the printer 1 shifts from the standby mode to a state for executing the image forming job JOB. Flow charts in the present specification basically indicate processings by the CPU 12 according to instructions described in the program. Accordingly, processings such as "detect", "determine", and "transmit" in the following explanation indicate the processings by the CPU 12. The processings by the CPU 12 also include hardware control. The supply-power control processing illustrated in FIGS. 3 and 4 may be executed by a device other than the CPU 12. For example, the power controller 25 may execute the supply-power control processing illustrated in FIGS. 3 and 4 by executing the program PG.

At step 11 in FIG. 3, the CPU 12 of the printer 1 determines whether connection to the USB connector 19 has been detected. Hereinafter, "Step" will be simply referred to as "S". The CPU 12 repeatedly executes the determination processing of S11 until the external device 61 is connected to the USB connector 19 after the startup of the system (S11: NO), for example. The CPU 12 makes an affirmative determination at S11 (S11: YES) when USB communication has been newly established with the external device 61, for example. When the CPU 12 detects that the external device 61 has been connected to the USB connector 19, for example, the CPU 12 makes an affirmative determination at S11. Alternatively, when the printer 1 is powered on in a state in which the external device 61 is connected to the USB connector 19, the CPU 12 detects the connection of the external device 61 and makes an affirmative determination at S11. By executing S11, the CPU 12 always makes the determination as to new connection to the USB connector 19 after the startup of the printer 1.

When the CPU 12 makes an affirmative determination at S11, the CPU then executes S13. At S13, the CPU 12 transmits the supply capability message (FIG. 2) to the external device 61 connected to the USB connector 19. The CPU 12 transmits, to the external device 61, the supply capability message containing the information on the power list. For example, predetermined values may be used as the supply voltage Vs and the supply current As contained in the power list. Alternatively, as the supply voltage Vs and the supply current As, there may be used values set by the CPU 12 when executing S13 based on a maximum power amount that is a maximum power amount W suppliable from the printer 1 to the external device 61 via the USB connector 19.

When the CPU 12 executes S13, the CPU 12 then determines whether the supply request message has been received from the external device 61 (S15). The CPU 12 repeatedly executes the determination processing of S15 until the supply request message is received (S15: NO). When the CPU 12 determines that the supply request message has been received from the external device 61 (S15: YES), the CPU 12 then determines whether the Mismatch flag of the received supply request message is OFF (S17).

In a case where the Mismatch flag is ON, this means that the combination of the supply voltage Vs and the supply current As desired to be requested by the external device 61 is not present in the power list presented by the printer 1. Thus, when the Mismatch flag is ON (S17: NO), the CPU 12 transmits the supply reject message to the external device 61 to notify the external device 61 that the electric power cannot be supplied (S19). The CPU 12 ends the supply-power control processing. In this case, the power supplying does not start.

On the other hand, when the Mismatch flag is OFF (S17: YES), the CPU 12 transmits the supply accept message to the external device 61 and notifies the external device 61 that it is possible to supply the power amount W settled by the combination of the supply voltage Vs and the supply current As contained in the supply request message received at S15, namely, it is possible to supply the power amount W requested by the external device 61 (S21). The CPU 12 controls the power source 27 and executes preparation for generating and supplying the supply voltage Vs and the supply current As requested by the external device 61. When the preparation for supplying the power amount W is completed, the CPU 12 transmits the supply preparation completion message to the external device 61 (S21).

After having executed S21, the CPU 12 starts supplying the power amount W via the Vbus signal line (S23). When the power amount W starts to be supplied at S23, the CPU 12 determines whether the image forming job JOB has been received (S25). When the CPU 12 receives, from the PC 63 (FIG. 1), the print job instructing printing based on image data, for example, the CPU 12 determines that the image forming job JOB has been received (S25: YES). Further, the CPU 12 determines that the image forming job JOB has been received (S25: YES) when execution of copying or scanning has been received based on the operation input to the user interface 20, for example. The image forming job JOB received here by the CPU 12 is one example of a first operation in the present disclosure. The CPU 12 repeatedly executes the processing of S25 until the CPU 12 receives the image forming job JOB (S25: NO). In this configuration, the CPU 12 receives the image forming job JOB during the power supplying.

When the CPU 12 makes an affirmative determination at S25 (S25: YES), the CPU 12 determines whether a total power amount is greater than a power source capacity (S27). Here, the total power amount is a sum of: the power amount to be consumed in the printer 1 when executing the image forming job JOB; and the power amount W being currently supplied to the external device 61, for example. Accordingly, the total power amount is a total value of the power amount required by the printer 1 in a case where the image forming job JOB is executed while the power supplying is kept executed. The power source capacity is, for example, a power amount that can be supplied from the power source 27, namely, a power amount that can be used in the printer 1. In this respect, when the total power amount exceeds the power source capacity, the printer 1 suffers from power shortage. The printer 1 may reduce the total power amount by restricting a part of functions not used in the image forming job JOB.

When the total power amount is not greater than the power source capacity (S27: NO), the CPU 12 starts executing the image forming job JOB (S29). In this case, the CPU 12 does not suffer from power shortage, and the CPU 12 executes the image forming job JOB without limiting the power amount W. After having executed S29, the CPU 12 determines whether the image forming job JOB that has started to be executed is completed (S31). The CPU 12 repeatedly executes the determination processing of S31 until the image forming job JOB is completed (S31: NO). When the CPU 12 determines that the image forming job JOB is completed, (S31: YES), the CPU 12 executes the processing at and after S25. Thus, the CPU 12 can receive and execute the image forming job JOB during the power supplying.

On the other hand, when the CPU 12 determines at S27 that the total power amount is greater than the power source capacity (S27: YES), the CPU 12 executes S33 of FIG. 4. At S33, the CPU 12 transmits the supply minimization request message and the supply preparation completion message (FIG. 2) to the external device 61 to which the electric power is being supplied. Thus, the external device 61 is notified that the limiting of the power amount W is to be executed from now on.

After having executed S33, the CPU12 limits the power amount (S35). For example, the CPU 12 controls the power source 27 so as to execute a processing for reducing the power amount W. For example, the CPU 12 determines the power amount W (supply voltage Vs, supply current As) that satisfies the minimum operating current value, namely, the power amount W whose current value is not lower than the minimum operating current, based on: the power list transmitted to the external device 61; and the minimum operating current value. The CPU 12 causes the power source 27 to generate the determined power amount W to supply the generated power amount W to the external device 61 (S35).

In this configuration, the external device 61 can receive the power amount W whose current value is not lower than the minimum operating current value requested beforehand by the supply request message.

By starting limiting the power amount W at S35, the CPU 12 secures electric power for executing the image forming job JOB received at S25. When the CPU 12 executes S35, the CPU 12 then starts executing the image forming job JOB (S37). In this respect, the CPU 12 may start executing the image forming job JOB before starting limiting the power amount W or may execute, in parallel, the starting process for limiting the power amount and the starting process of the image forming job JOB. The CPU 12 may execute S35 to start limiting the power amount W without transmitting the supply minimization request message and the supply preparation completion message at S33. The CPU 12 may limit the power amount W down to the supply current As with a current value lower than the minimum operating current.

After having executed S37, the CPU 12 executes S39. The CPU 12 determines whether the image forming job JOB that has started to be executed at S37 is completed (S39). The CPU 12 executes the determination processing of S39 until the image forming job JOB is completed (S39: NO). When the CPU 12 determines that the image forming job JOB is completed (S39: YES), the CPU 12 executes S41.

At S41, the CPU 12 determines whether any subsequent operation is present. The subsequent operation is one example of a second operation in the present disclosure. Examples of the subsequent operation are as follows. In a case where a plurality of image forming jobs JOB are received at one time at S25 of FIG. 3, the subsequent operation is, for example, an image forming job or jobs JOB other than one of the plurality of image forming jobs JOB that has initially started to be executed. For example, the subsequent operation is an image forming job JOB newly received after reception of the image forming job JOB at S25 of FIG. 3. For example, the subsequent operation is an image forming job JOB newly received during execution of the subsequent operation after S43 that will be explained. When such a subsequent operation is present, a plurality of image forming jobs JOB is accumulated in the printer 1. If the limiting of the power amount W is canceled immediately after completion of a previously received image forming job JOB, there arises a need for again limiting the power amount W to execute the subsequent operation. This inevitably increases the number of times of switchovers between the limiting of the power amount W and cancellation of the limiting of the power amount W and the number of times of communications with the external device 61 for the switchover.

In view of the above, the CPU 12 of the present embodiment determines at S41 whether there is any subsequent operation. When the CPU 12 determines that the subsequent operation is present, the CPU 12 executes the subsequent operation while keeping limiting the power amount W, without canceling the limiting of the power amount W. Specifically, when the CPU 12 determines at S41 that the subsequent operation is present (S41: YES), the CPU 12 starts to execute the subsequent operation (S43). For example, the CPU 12 makes an affirmative determination at S41 if non-executed print job is left in a case where the CPU 12 receives a plurality of print jobs from the external device 61. For example, the CPU 12 makes an affirmative determination at S41 when the print job is received from the external device 61 in the midst of execution of the scan job received via the operation on the user interface 20. As described above, the first and second operations of the present disclosure are not limited to the image forming job JOB. Thus, the CPU 12 may make an affirmative determination at S41 in a case where the CPU 12 determines execution of the cooling-down operation as the second operation during executing the print job as the first operation. The CPU 12 may make an affirmative determination at S41 in a case where the CPU 12 determines execution of the image-quality calibration operation as the second operation during executing the cooling-down operation as the first operation.

After having executed S43, the CPU 12 determines as S45 whether the subsequent operation that has started to be executed at S43 is completed. The CPU 12 executes the determination processing of S45 until the subsequent operation is completed (S45: NO). When the subsequent operation is completed (S45: YES), the CPU 12 executes S41. The CPU 12 determines whether any subsequent operation is present other than the subsequent operation for which the CPU 12 has determined at S45 that execution thereof is completed. When other subsequent operation is present (S41: YES), the CPU 12 again executes the processings at and after S43. When the CPU 12 receives a plurality of subsequent operations, for example, the CPU 12 executes those subsequent operations in the order of reception. The CPU executes the processings at S41-S45 until all the subsequent operations are completed.

When the CPU 12 determines at S41 that no subsequent operations are present (S41: NO), the CPU executes the processing at S13 in FIG. 3. The CPU 12 executes the processings at and after S13, so as to transmit the supply capability message etc., to the external device 61 and start supplying the power amount W required by the external device 61. With the configuration, the limiting of the power amount W can be canceled after completion of all the image forming jobs JOB including the subsequent operation or operations.

In a case where the CPU 12 detects a supply stop factor after having started supplying the electric power by executing the supply-power control processing illustrated in FIGS. 3 and 4, the CPU 12 may stop supplying the electric power. Here, the supply stop factor is a factor responsible for stopping supplying the power amount W. For example, the CPU 12 may determine that the supply stop factor is detected when the CPU 12 receives the supply stop request (FIG. 2) from the external device 61. For example, the CPU 12 may determine that the supply stop factor is detected when the CPU 12 detects that the connection with the external device 61 via the USB connector 19 is cut. When the CPU 12 detects the supply stop factor, the CPU 12 may stop supplying the power amount W, so as to end the supply-power control processing. With the configuration, the power supplying can be stopped in a case where the supply stop request is made by the external device 61 or in a case where abnormality occurs in USB connection.

5. Second Embodiment

There will be next explained a second embodiment of the present disclosure. In the power-supply control processing illustrated in FIGS. 3 and 4 according to the first embodiment, the limiting of the power amount W is canceled when it is determined that the subsequent operation has been completed. In the second embodiment, the limiting of the power amount W is canceled in accordance with a timing of shifting to the power saving mode. In the following explanation, the same reference numerals as used in the illustrated first embodiment are used to identify the corresponding configurations, and an explanation thereof is dispensed with. The following explanation is made for a case where the image forming job JOB is employed as an operation relating to image formation by the image forming device according to the present disclosure.

Figure 5:
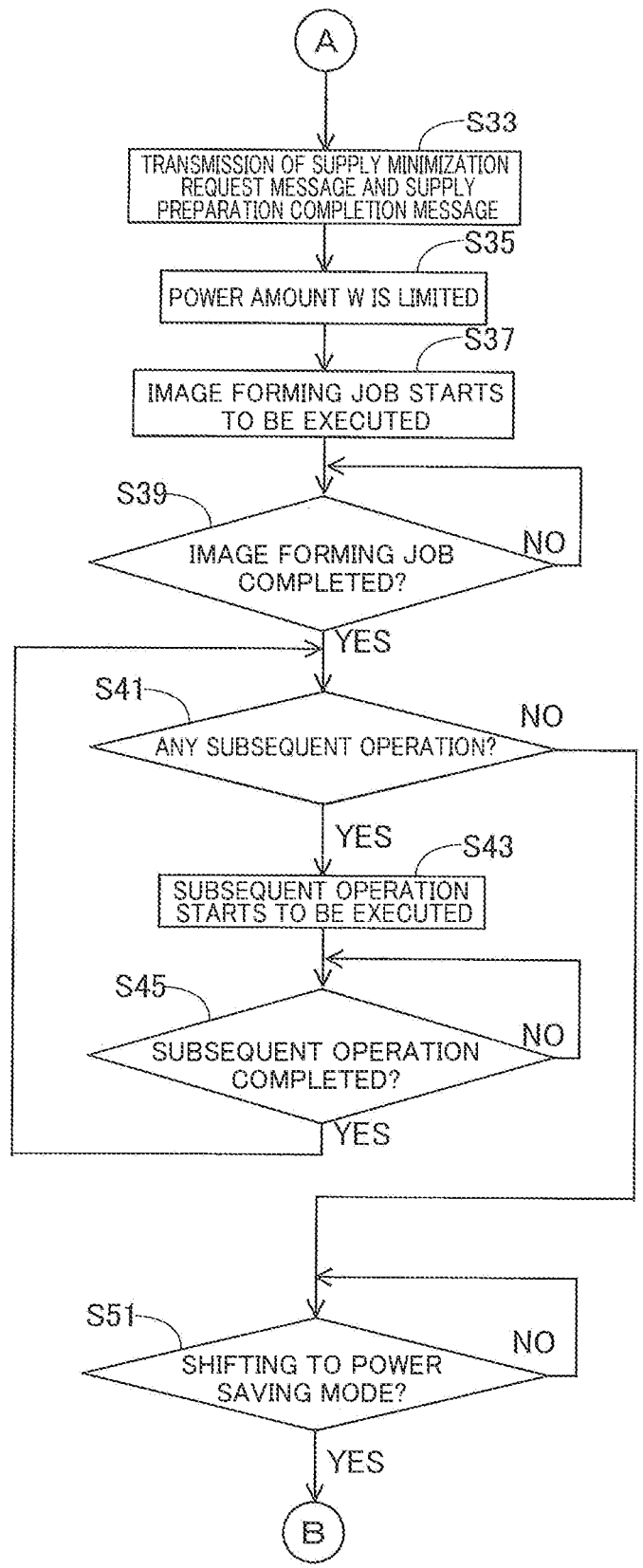
FIG. 5 is a part of a flowchart indicating a supply-power control processing executed in a second embodiment.

FIG. 5 illustrates details of a supply-power control processing according to the second embodiment. In the second embodiment, processings prior to S33 are the same as those in FIG. 3, and the explanation of the second embodiment will be made referring to FIG. 3. As illustrated in FIG. 5, when the CPU 12 determines at S41 that no subsequent operations are present in a state in which the power amount W is limited at S35 (S41: NO), the CPU 12 determines whether the printer 1 shifts to the power saving mode (S51). The CPU 12 executes the determination processing at S51 based on the mode determination flag MF stored in the NVRAM 15. The CPU 12 makes a negative determination at S51 (S51: NO) in a case where the mode determination flag MF is OFF. In this case, the CPU 12 again executes the determination processing at 51. The CPU 12 makes an affirmative determination at S51 (S51: YES) in a case where the mode determination flag is ON. In this case, the CPU 12 executes the processing at S13 in FIG. 3. Thus, the CPU 12 according to the second embodiment cancels the limiting of the power amount W at the timing when the printer 1 shifts to the power saving mode after completion of all the image forming jobs JOB including the subsequent operation or operations.

Figure 6:
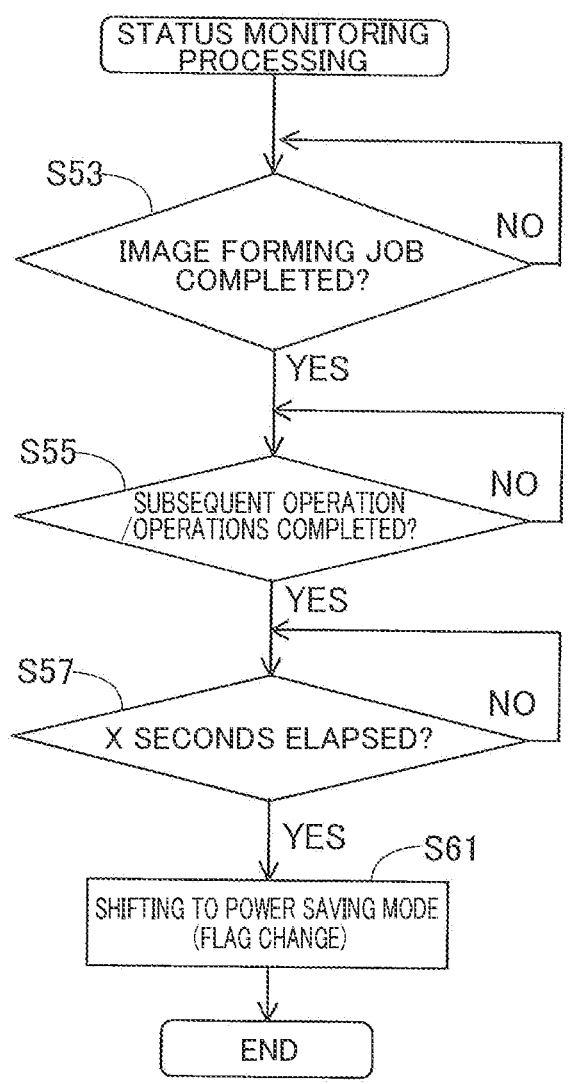
FIG. 6 is a flowchart indicating a status monitoring processing executed in the second embodiment.

FIG. 6 illustrates details of a status monitoring processing for changing the setting of the mode determination flag MF from OFF to ON. The CPU 12 starts the status monitoring processing illustrated in FIG. 6 on condition that the CPU 12 starts to execute the image forming job JOB received at S25 in FIG. 3. The CPU 12 executes, in parallel, the supply-power control processing illustrated in FIGS. 3, 5 and the status monitoring processing illustrated in FIG. 6.

When the status monitoring processing starts, the CPU 12 determines whether the image forming job JOB has been completed (S53). The CPU 12 determines whether the image forming job JOB received at S25 has been completed. When the CPU 12 determines that the image forming job JOB has been completed (S53: YES), the CPU 12 determines whether the subsequent operation or operations have been completed (S55). The CPU 12 makes an affirmative determination at S55 (S55: YES) in a case where all the subsequent operations have been completed or in a case where no subsequent operations are present in the first place. The CPU 12 then executes S57. Thus, the CPU 12 executes S57 upon completion of all the received image forming jobs JOB.

The CPU 12 determines at S57 whether X seconds have elapsed. The CPU 12 repeatedly executes the determination processing at S57 until X seconds elapse (S57: NO). When the CPU 12 determines that X seconds have elapsed (S57: YES), the CPU 12 executes S61. At S61, the CPU 12 changes the setting of the mode determination flag MF from OFF to ON and causes the printer 1 to shift to the power saving mode. Thus, the time corresponding to X seconds used for the determination at S57 is a time for determining whether the printer 1 shifts to the power saving mode.

The CPU 12 makes an affirmative determination at S51 in FIG. 5 by setting the mode determination flag MF to ON at S61. The CPU 12 then cancels the limiting of the power amount W by executing the processings at and after S13 in FIG. 3. In this way, the limiting of the power amount W can be canceled in accordance with the timing of shifting to the power saving mode. When the printer 1 shifts from the power saving mode such as when shifting to a normal mode in response to reception of the image forming job JOB or the like in the power saving mode, the CPU 12 changes the setting of the mode determination flag from ON to OFF.

The timing of starting measuring a lapse of X seconds and the time length of X seconds are not limited to particular ones. For instance, the CPU 12 may start measuring X seconds and may determine at 57 the lapse of X seconds from a time point when the CPU 12 makes an affirmative determination at S55, namely, from a timing when the CPU 12 determines that all the image forming jobs JOB including the subsequent operation or operations have been completed. Alternatively, the CPU 12 may start measuring X seconds from a timing when the processing at S57 starts to be executed.

The CPU 12 need not necessarily start the measurement of X seconds in a case where a factor responsible for not shifting to the power saving mode has occurred prior to the measurement of X seconds. The CPU 12 may suspend or stop the measurement of X seconds in a case where the factor responsible for not shifting to the power saving mode has occurred during the measurement of X seconds. Examples of the factor responsible for not shifting to the power saving mode include: (1) occurrence of data transmission/reception; (2) occurrence of a login processing; and (3) occurrence of a user's operation. (1) The occurrence of data transmission/reception refers to a case where data transmission/reception occurs in the USB communication via the USB connector 19 or in wired or wireless communication via the user interface 20. The CPU 12 need not necessarily start the measurement of X seconds in a case where the CPU 12 has been executing, prior to starting the measurement of X seconds, data transmission/reception with a certain device through the USB communication via the USB connector 19, for example. The CPU 12 may suspend or stop the measurement of X seconds in a case where, during the measurement of X seconds, new communication is established and data transmission/reception starts in wired communication via the user interface 20, for example. Thus, the CPU 12 need not necessarily start the measurement of X seconds, the CPU 12 may suspend the measurement of X seconds, or the CPU 12 may stop the measurement of X seconds in a case where the CPU 12 detects that the printer 1 has started or is executing, for some purpose, data transmission/reception. When the CPU 12 detects that data transmission/reception is ended, for example, the CPU 12 may start the measurement of X seconds. In a case where the CPU 12 suspended the measurement of X seconds, the CPU 12 may continue to measure from a time point when the CPU 12 suspended the measurement or the CPU 12 may reset the measured time so as to restart measuring X seconds from the beginning. This configuration prevents the printer 1 from shifting to the power saving mode and accordingly prevents communication from being disconnected, during data transmission/reception. The way to detect completion of data transmission/reception is not limited to a particular one. For example, the CPU 12 may determine completion of data transmission/reception in a case where the CPU 12 detects transmission/reception of data indicating completion of communication or in a case where the CPU 12 detects a break of communication session or connection.

(2) The occurrence of the login processing refers to an occurrence of a login processing with respect to the printer 1. For example, the printer 1 may set, for each user, an authority for the printing operation or the scanning operation, and may confirm the user's authority by the login processing. Alternatively, the printer 1 may confirm the user by the login processing when printing confidential documents, for example. For example, the printer 1 may execute user authentication based on the operation input to the touch panel of the user interface 20 so as to confirm the user having logged in. In such a case, the CPU 12 need not necessarily start the measurement of X seconds when a user being logged in to the printer 1 has been present prior to the measurement of X seconds. For example, the CPU 12 may suspend or stop the measurement of X seconds in a case where the CPU 12 detects a success of login authentication to the printer 1 after having started measuring X seconds. This configuration prevents the printer 1 from shifting to the power saving mode and accordingly prevents the operation by the user being logged in from being interrupted, in the midst of the logged-in user's operation.

(3) The occurrence of the user's operation refers to an occurrence of a user's operation to use the printer 1. The CPU 12 may stop or suspend the measurement of X seconds in a case where the CPU 12 detects the operation input to the user interface 20 during the measurement of X seconds, for example. The CPU 12 may stop the measurement in a case where the CPU 12 detects, by a human detecting sensor, the user approaching the printer or in a case where the CPU 12 detects a user's operation to replenish the printer 1 with sheets.

The CPU 12 may stop the processing of FIG. 6 in a case where the CPU 12 receives a new image forming job JOB after having made an affirmative determination at S55 (S55: YES). When the CPU 12 receives a new image forming job JOB during the measurement of X seconds, for example, the CPU 12 may stop the processing of FIG. 6 being currently executed and may start the processing at S53 for the newly received image forming job JOB.

6. Third Embodiment

There will be next explained a third embodiment according to the present disclosure. In the supply-power control processing and the status monitoring processing illustrated in FIGS. 5 and 6 according to the second embodiment, the determination as to shifting to the power saving mode is made when no subsequent operations are present (S41: NO, S55: NO). In the third embodiment, the determination as to shifting to the power saving mode is made without determining the presence or absence of the subsequent operation. In the following explanation, the same reference numerals as used in the illustrated first and second embodiments are used to identify the corresponding configurations, and explanation thereof is dispensed with.

Figure 7:
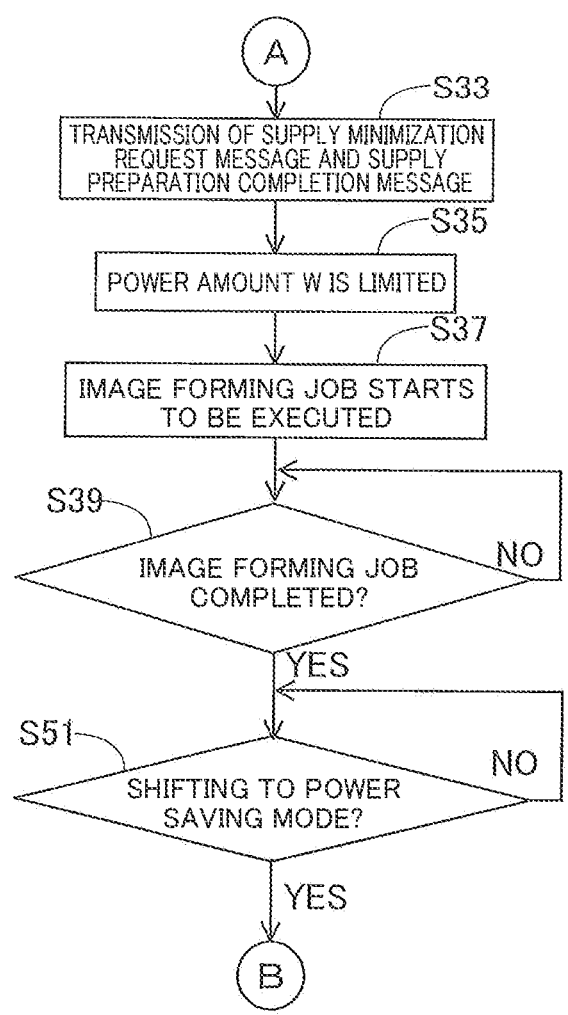
FIG. 7 is a part of a flowchart indicating a supply-power control processing executed in a third embodiment.

FIG. 7 illustrates details of a supply-power control processing according to the third embodiment. Processings prior to S33 are the same as those in FIG. 3, and the explanation of the third embodiment will be made referring to FIG. 3. As illustrated in FIG. 7, the CPU 12 starts to execute the image forming job JOB at S37 in a state in which the power amount W is limited at S35. When the CPU 12 determines that the image forming job JOB has been completed (S39: YES), the CPU 12 then determines whether the printer 1 shifts to the power saving mode (S51).

Figure 8:
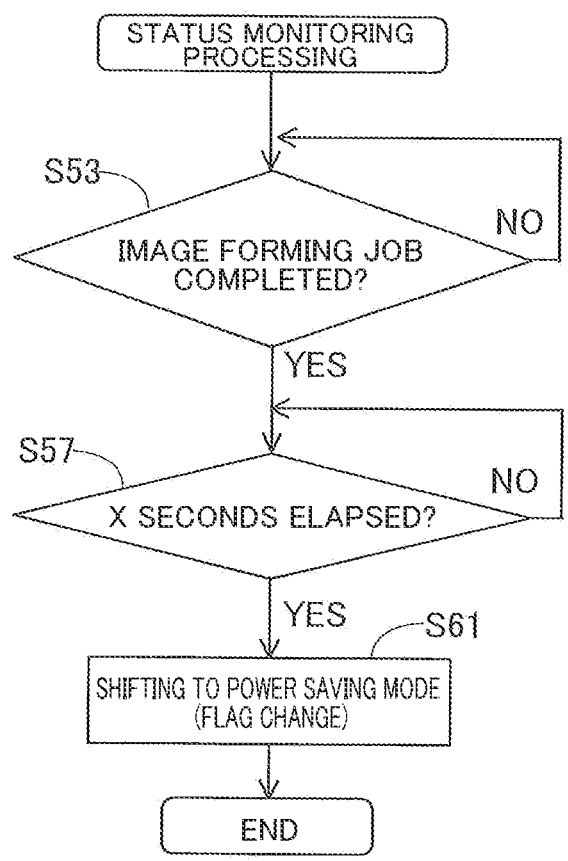
FIG. 8 is a flowchart indicating a status monitoring processing executed in the third embodiment.

FIG. 8 illustrates details of a status monitoring processing according to the third embodiment. As illustrated in FIG. 8, when the CPU 12 determines that the image forming job JOB received at S25 of FIG. 3 has been completed (S53: YES), the CPU 12 determines whether X seconds have elapsed (S57) without executing the determination as to the presence or absence of the subsequent operation, namely, without executing S55 in FIG. 6. When the CPU 12 determines that X seconds have elapsed (S57: YES), the CPU 12 changes the setting of the mode determination flag MF stored in the NVRAM 15 from OFF to ON, so as to cause the printer 1 to shift to the power saving mode (S61).

At S51 in FIG. 7, the CPU 12 executes the determination processing at S51 based on the mode determination flag MF. When the setting of the mode determination flag MF is ON (S51: YES), the CPU 12 executes the processing at S13 in FIG. 3. Thus, in the third embodiment, the CPU 12 cancels the limiting of the power amount W at a timing of shifting to the power saving mode after completion of the image forming job JOB executed during the limiting of the power amount W (as one example of an operation relating to image formation by the image forming device in the present disclosure), without executing the determination as to the presence of absence of the subsequent operation.

The printer 1 is one example of an image forming apparatus. The CPU 12 is one example of a controller. The image forming device 16 and the image reader 17 are one example of an image forming device. The USB connector 19 is one example of an interface. The image forming job JOB is one example of the first operation, the second operation, and the operation relating to image formation by the image forming device. S23 is one example of a power supplying step, a first power supplying step, and a second power supplying step. S25 is one example of a first determination step and a determination step. S35 is one example of a power-amount limiting step. S37 is one example of a first execution step and an execution step. S41 is one example of a second determination step. S51 and S57 are one example of a mode-shifting determination step. S61 is one example of a mode shifting step.

7. Effects

The embodiments illustrated above offer the following effects. (1) The CPU 12 of the printer 1 in the first embodiment executes the processing of S23 in which the electric power is supplied to the external device 61 via the USB connector 19 and the processing of S25 to determine whether to execute, during executing the power supplying, the image forming job JOB (as one example of the first operation). The CPU 12 executes the processing of S35 to limit the power amount to be supplied to the external device 61 when the CPU 12 determines to execute the image forming job JOB (S25: YES) based on a result of S25. The CPU 12 executes the processing of S37 to execute the image forming job JOB in a state in which the CPU 12 limits the power amount W to be supplied to the external device 61. The CPU 12 executes the processing of S41 to determine, after the CPU 12 has started S37, whether to execute the subsequent operation. The processing of S23 is one example of a power supplying processing, i.e., supplying the electric power to the external device via the interface. The processing of S25 is one example of a first determining processing, i.e., determining whether to execute the first operation. The processing of S35 is one example of a power-amount limiting processing, i.e., the limiting the power amount. The processing of S37 is one example of a first executing processing, i.e., executing the first operation. The processing of S41 is one example of a second determining processing, determining whether to execute the second operation.

According to the above configuration, in a case where the CPU 12 executes the image forming job JOB during supplying the electric power, the CPU 12 limits the power amount W and executes the image forming job JOB. After having started executing the image forming job JOB, the CPU 12 determines whether to execute the subsequent operation (such as another image forming job JOB). In this configuration, if it is not necessary to execute the subsequent operation, the limiting of the power amount W is canceled after completion of the image forming job JOB, thus enabling a prompt restart of the power supplying. In a case where the subsequent operation is executed, the CPU 12 can take appropriate measures. For example, the CPU 12 keeps limiting the power amount W until the subsequent operation is completed and cancels the limiting after completion of the subsequent operation. This enables the limiting of the power amount W to be canceled at an appropriate timing.

(2) The CPU 12 executes S41 after completion of a previously received image forming job JOB (S39: YES). Consider a case in which the CPU 12 determines the presence or absence of the subsequent operation during executing the previously received image forming job JOB. In such a case, if a need to execute the subsequent operation occurs immediately before completion of the previously received image forming job JOB, the CPU 12 may fail to detect the presence of such a subsequent operation. In this case, the CPU 12 inevitably notices the presence of the subsequent operation after completion of the image forming job JOB and cancellation of the limiting of the power amount W, so that the CPU 12 has to again limit the power amount W. In contrast, the CPU 12 of the present embodiment determines the presence or absence of the subsequent operation after completion of the previously received image forming job JOB, so that the CPU 12 can detect, without fail, the subsequent operation for which there has arisen a need to be executed before completion of the image forming job JOB. It is consequently possible to decrease a frequency of occurrence of the processing for limiting the power amount W. Further, the subsequent operation can be promptly started after completion of the previously received image forming job JOB without canceling the limiting of the power amount W. This enables the subsequent operation to be completed more promptly.

(3) When the CPU 12 determines to execute the subsequent operation (S41: YES) based on a result of S41, the CPU 12 executes the processing of S43 (as one example of a second determining processing, i.e., second determination) to execute the subsequent operation while keeping limiting the power amount W to be supplied to the external device 61 even after completion of the previously received image forming job JOB. The processing of S43 is one example of a second determining processing, i.e., determining whether to execute the second operation.

If the limiting of the power amount W is canceled before starting the subsequent operation, it is needed to again limit the power amount W when the subsequent operation is started. In contrast, when the present CPU 12 executes the subsequent operation, the CPU 12 keeps limiting the power amount W even after completion of the previously received image forming job JOB and executes the subsequent operation. This configuration can decrease the number of times of transmission/reception of communication data (such as transmission of the supply minimization request message) relating to the limiting of the power amount W and the number of times of switchovers between the limiting of the power amount W and the cancellation of the limiting of the power amount W. It is consequently possible to decrease unnecessary processings and unnecessary processing time by canceling the limiting of the power amount W at an appropriate timing.

(4) In a case where a plurality of the subsequent operations are present, the CPU 12 keeps limiting the power amount W to be supplied to the external device 61 until all the plurality of subsequent operations are completed to be executed (S41: YES). When all the plurality of subsequent operations are completed to be executed (S41: NO), the CPU 12 supplies the electric power to the external device 61 after having canceled the limiting of the power amount W to be supplied to the external device 61.

According to the above configuration, in a case where a plurality of the subsequent operations are present, the CPU 12 keeps limiting the power amount W until all the plurality of subsequent operations are completed, thereby decreasing the number of times of transmission/reception of communication data relating to the limiting of the power amount W and the number of times of switchovers between the limiting of the power amount W and the cancellation of the limiting of the power amount W.

(5) As the first and second operations in the embodiments illustrated above, there may be employed at least one of the operation for executing the image forming job (as one example of an image forming operation), the cooling-down operation for releasing heat accumulated in the printer 1, and the image-quality calibration operation for adjusting the image quality.

The image forming operation, the cooling-down operation, and the image-quality calibration operation cause the toner cartridge, the fixing device, etc., to be operated, resulting in an increase in power consumption. As a result, the own apparatus may suffer from power shortage. In this instance, it is needed to limit the power amount W for executing the first operation and the second operation. In the printer 1 according to the embodiments illustrated above, when the operation relating to image formation by the image forming device 16, etc., is executed, the necessity or unnecessity of execution of the second operation is determined, so that the limiting of the power amount W can be canceled at an appropriate timing.

(6) The CPU 12 of the printer 1 according to the second embodiment illustrated in FIGS. 5 and 6 executes the processing at S23 to supply the electric power to the external device 61 via the USB connector 19, the processing of S25 to determine whether to execute, during executing the power supplying, the image forming job JOB, and the processing of S35 to limit the power amount W to be supplied to the external device 61 when the controller determines to execute the image forming job JOB (S25: YES) based on a result of S25. Further, the CPU 12 executes the processing of S37 to execute the image forming job JOB in a state in which the power amount W is limited, the processings of S51 and S57 to determine whether to shift, after completion of the image forming job JOB, to the power saving mode for reducing power consumption, and the processing of S23 (after execution of S51) to supply the electric power to the external device 61 after having canceled the limiting of the power amount W when the CPU 12 determines to shift to the power saving mode (S57: YES). When the CPU 12 determines to shift to the power saving mode (S57: YES), the CPU 12 executes the processing of S61 to shift to the power saving mode. The processing at S23 is one example of a first power supplying processing, i.e., supplying the electric power to the external device via the interface. The processing of S25 is one example of a determination processing, i.e., determining whether to execute the operation relating to the image formation. The processing of S35 is one example of a power-amount limiting processing, i.e., the limiting the power amount. The processing of S37 is one example of an execution processing, i.e., executing the operation relating to the image formation. Each of the processings of S51 and S57 is one example of a mode-shifting determination processing, i.e., determining whether to shift to the power saving mode after having canceled the limiting of the power amount. The processing of S23 (after execution of S51) is one example of a second power supplying processing, i.e., supplying the electric power to the external device. The processing of S61 is one example of a mode shifting processing, i.e., shifting to the power saving mode.

According to the above configuration, the CPU 12 of the second embodiment determines whether to shift to the power saving mode after completion of the image forming job JOB. When shifting to the power saving mode, the CPU 12 cancels the limiting of the power amount W, starts supplying the electric power to the external device 61, and shifts to the power saving mode. When shifting to the power saving mode, the printer 1 is in a status in which it is possible to determine that shifting to the standby state by reducing power consumption is acceptable, such as a status in which the need for performing the operation relating to image formation (e.g., the image forming job JOB, the cooling-down operation, or the image-quality calibration operation) does not occur for a predetermined length of time. In other words, in such a status of the printer 1, no operations relating to image formation are occurring, and it is accordingly possible to reduce power consumption. Thus, there is a high probability of increase in surplus power. The CPU 12 of the second embodiment cancels the limiting of the power amount W and starts supplying the electric power in accordance with shifting to the power saving mode. Thus, the CPU 12 can cancel the limiting of the power amount at an appropriate timing.

8. Modifications

It is to be understood that the present disclosure is not limited to the details of the illustrated embodiments, but may be embodied with various changes and modifications, which may occur to those skilled in the art, without departing from the spirit and the scope of the present disclosure.

In the illustrated embodiments, the control illustrated in FIGS. 3-6 is executed by the CPU 12. The control may be executed by other device. For example, the power controller 25 may execute the control illustrated in FIGS. 3-6 by executing the program PG stored in the memory 26. In this case, the power controller 25 is one example of the controller in the present disclosure. The program PG is one example of the program in the present disclosure.

The CPU 12 in the first embodiment cancels the limiting of the power amount W immediately when the subsequent operation is completed. The CPU 12 may wait for a predetermined length of time.

The limiting of the power amount in the present disclosure is a concept including not only merely reducing the power amount but also reducing the power amount to zero.

The processing details and the processing order in the flowcharts of FIGS. 3-6 are one example. In the processings explained above, the CPU 12 executes the processing of S41 to determine the presence or absence of the subsequent operation after completion of the previously received image forming job JOB (as one example of the first operation) (S39: YES). The present disclosure is not limited to this configuration. For instance, the CPU 12 may determine the presence or absence of the subsequent operation before completion of the previously received image forming job JOB.

The CPU 12 may ask the user, before starting to execute the subsequent operation, whether to keep limiting the power amount W and whether to start execution of the subsequent operation. In this case, if the user assigns a higher priority to the cancellation of the power amount W, the limiting of the power amount W may be canceled before starting the subsequent operation.

When a plurality of subsequent operations are present, the CPU 12 does not cancel, in the processings explained above, the limiting of the power amount W until all the plurality of subsequent operations are completed. In executing the plurality of subsequent operations in order, the CPU 12 may ask the user, every time when one subsequent operation is completed, whether to continue execution of the subsequent operation while keeping limiting the power amount W. In this case, if the user assigns a higher priority to the cancellation of the limiting of the power amount W, the CPU 12 may cancel the limiting of the power amount W before completion of all the subsequent operations.

When the CPU 12 makes an affirmative determination at S25 (S25: YES), the CPU 12 may execute S33 without executing the processings at S27, S29, and S31. That is, the CPU 12 may limit the power amount W irrespective of whether the total power amount is greater than or less than the power source capacity.

The communication standard of the interface in the present disclosure is not limited to that according to the USB PD standard but may be any other communication standard according to which the power transmission/reception is executable.

While the CPU 12 is employed as the controller in the illustrated embodiments, the present disclosure is not limited to this configuration. For example, at least a part of the controller may be specific hardware such as ASIC (Application Specific Integrated Circuit). The controller may be operated by a combination of software processing and hardware processing.

The power source 27 may be configured not to include the battery 31.

In the illustrated embodiments, the portable printer 1 is employed as the image forming apparatus of the present disclosure. The present disclosure is not limited to this configuration. The image forming apparatus of the present disclosure may be a non-portable stationary printer. The image forming apparatus of the present disclosure is not limited to a printer but may be any of a copying machine, a facsimile machine, and a scanning machine. The image forming apparatus of the present disclosure may be a multi-function peripheral (MFP) having a plurality of functions. The image forming apparatus of the present disclosure may include a facsimile (FAX) communication device configured to perform transmission/reception of facsimile data with other facsimile machine via a telephone line. The image forming apparatus of the present disclosure is not limited to the one equipped with the image forming device 16 and the image reader 17. For example, there may be employable, as the image forming apparatus, various electronic devices (such as a camera) including an interface capable of supplying electric power.

What is claimed is:
1. An image forming apparatus, comprising:
an image forming engine;
an interface; and
a controller;
wherein the controller is configured to:
supply electric power to an external device via the interface;
determine whether to execute, during executing the supplying the electric power to the external device via the interface, a first operation relating to image formation by the image forming engine;

limit a power amount to be supplied to the external device when the controller determines to execute the first operation based on a result of the determining whether to execute the first operation;

execute the first operation in a state in which the power amount to be supplied to the external device is limited; and determine, after the controller has started the executing the first operation, whether to execute a second operation different from the first operation.

2. The image forming apparatus according to claim 1, wherein the controller executes the determining whether to execute the second operation after completion of executing the first operation.

3. The image forming apparatus according to claim 1, wherein, when the controller determines to execute the second operation based on a result of the determining whether to execute the second operation, the controller executes the second operation while keeping limiting the power amount to be supplied to the external device even after completion of the executing the first operation.

4. The image forming apparatus, according to claim 3, wherein, when a plurality of the second operations is present, the controller keeps limiting the power amount to be supplied to the external device until all the plurality of second operations are completed to be executed, and wherein, when all the plurality of the second operations are completed to be executed, the controller supplies the electric power to the external device after having canceled the limiting of the power amount to be supplied to the external device by the limiting the power amount.

5. The image forming apparatus according to claim 1, wherein the first operation and the second operation include at least one of an image forming operation of forming an image by the image forming engine, a cooling-down operation of releasing heat accumulated in the image forming engine, and an image-quality calibration operation of adjusting a quality of the image formed by the image forming engine.

6. The image forming apparatus according to claim 1, wherein the interface is a USB (Universal Serial Bus) interface.

7. The image forming apparatus according to claim 1, wherein the interface is an interface according to USB PD (USB power delivery).

8. An image forming apparatus, comprising:
an image forming engine;
an interface; and
a controller,
wherein the controller is configured to:
supply electric power to an external device via the interface;
determine whether to execute, during executing the supplying the electric power to the external device via the interface, an operation relating to image formation by the image forming engine;
limit a power amount to be supplied to the external device when the controller determines to execute the operation relating to the image formation based on a result of the determining whether to execute the operation relating to the image formation;
execute the operation relating to the image formation in a state in which the power amount to be supplied to the external device is limited;
determine, after completion of the executing the operation relating to the image formation, whether to shift to a power saving mode for reducing power consumption;
supply the electric power to the external device after having canceled the limiting of the power amount to be supplied to the external device by the limiting the power amount when the controller determines to shift to the power saving mode based on a result of the determining whether to shift to the power saving mode after having canceled the limiting of the power amount; and
shift to the power saving mode when the controller determines to shift to the power saving mode based on a result of the determining whether to shift to the power saving mode after having canceled the limiting of the power amount.

9. A method of controlling an image forming apparatus comprising an image forming engine, an interface, and a controller, the method comprising:
a power supplying step of supplying electric power to an external device via the interface;
a first determination step of determining whether to execute, during executing the power supplying step, a first operation relating to image formation by the image forming engine;
a power-amount limiting step of limiting a power amount to be supplied to the external device when the controller determines to execute the first operation based on a result of the first determination step;
a first execution step of executing the first operation in a state in which the power amount to be supplied to the external device is limited; and
a second determination step of determining, after the controller has started the first execution step, whether to execute a second operation different from the first operation.

10. The method according to claim 9, wherein the controller executes the second determination step after completion of executing the first operation.

11. The method according to claim 9, wherein, when the controller determines to execute the second operation based on a result of the second determination step, the controller executes a second execution step of executing the second operation while keeping limiting the power amount to be supplied to the external device even after completion of the first execution step.

12. The method according to claim 11,
wherein, when a plurality of the second operations is present, the controller keeps limiting the power amount to be supplied to the external device until all the plurality of second operations are completed to be executed, and wherein, when all the plurality of the second operations are completed to be executed, the controller supplies the electric power to the external device after having canceled the limiting of the power amount to be supplied to the external device by the power-amount limiting step.

13. The image forming apparatus according to claim 9, wherein the first operation and the second operation include at least one of an image forming operation of forming an image by the image forming engine, a cooling-down operation of releasing heat accumulated in the image forming engine, and an image-quality calibration operation of adjusting a quality of the image formed by the image forming engine.

14. The method according to claim 9, wherein the interface is a USB (Universal Serial Bus) interface.

15. The method according to claim 9, wherein the interface is an interface according to USB PD (USB power delivery).

16. A method of controlling an image forming apparatus comprising an image forming engine, an interface, and a controller, the method comprising:
   a first power supplying step of supplying electric power to an external device via the interface;
   a determination step of determining whether to execute, during executing the first power supplying step, an operation relating to image formation by the image forming engine;
   a power-amount limiting step of limiting a power amount to be supplied to the external device when the controller determines to execute the operation relating to the image formation based on a result of the determination step;
   an execution step of executing the operation relating to the image formation in a state in which the power amount to be supplied to the external device is limited;
   a mode-shifting determination step of determining, after completion of the execution step, whether to shift to a power saving mode for reducing power consumption;
   a second power supplying step of supplying the electric power to the external device after having canceled the limiting of the power amount to be supplied to the external device by the power-amount liming step when the controller determines to shift to the power saving mode based on a result of the mode-shifting determination step; and
   a mode shifting step of shifting to the power saving mode when the controller determines to shift to the power saving mode based on a result of the mode-shifting determination step.

17. A non-transitory storage medium storing a program executable by a computer of an image forming apparatus comprising an image forming engine and an interface,
   wherein, when executed by the computer, the program causes the image forming apparatus to:
      supply electric power to an external device via the interface;
      determine whether to execute, during executing the supplying the electric power to the external device via the interface, a first operation relating to image formation by the image forming engine;
      limit a power amount to be supplied to the external device when it is determined to execute the first operation based on a result of the determining whether to execute the first operation;
      execute the first operation in a state in which the power amount to be supplied to the external device is limited; and
      determine, after the executing the first operation has been started, whether to execute a second operation different from the first operation.

18. The non-transitory storage medium according to claim 17, wherein the interface is a USB (Universal Serial Bus) interface.

19. The non-transitory storage medium according to claim 17, wherein the interface is an interface according to USB PD (USB power delivery).

* * * * *